United States Patent [19]

Miller

[11] 4,019,051
[45] Apr. 19, 1977

[54] DIRECTIONAL OPTICAL WAVEGUIDE COUPLERS

[75] Inventor: Stewart Edward Miller, Locust, N.J.

[73] Assignee: Bell Telephone Laboratories, Incorporated, Murray Hill, N.J.

[22] Filed: Dec. 24, 1975

[21] Appl. No.: 644,139

[52] U.S. Cl. .............................. 250/227; 350/96 C; 350/96 WG
[51] Int. Cl.² ...................... G02B 5/14; H01J 5/16; H01J 39/12
[58] Field of Search ......... 250/227, 216; 350/96 C, 350/96 WG

[56] References Cited

UNITED STATES PATENTS

| | | | |
|---|---|---|---|
| 3,558,213 | 1/1971 | Marcatili | 350/96 WG |
| 3,813,141 | 5/1974 | Miller | 350/96 WG |
| 3,850,503 | 11/1974 | Riseberg | 350/96 WG |
| 3,918,794 | 11/1975 | Milton | 350/96 WG |
| 3,923,377 | 12/1975 | Milton | 350/96 WG |
| 3,931,518 | 1/1976 | Miller | 350/96 C |
| 3,936,631 | 2/1976 | Muska | 350/96 C |

*Primary Examiner*—Alfred E. Smith
*Assistant Examiner*—David K. Moore
*Attorney, Agent, or Firm*—Erwin W. Pfeifle

[57] ABSTRACT

Directional optical waveguide couplers for use with planar-form optical waveguides or optical fiber waveguides are disclosed. In the coupler arrangements, light energy propagating in a direction of interest in the core of a cladded optical waveguide is first coupled into a selected region of the cladding by a mode coupling means and then coupled out of the selected cladding region by a branching optical waveguide or power tap for subsequent conversion to a representative electrical signal. The selected region of the cladding is isolated from spurious cladding modes by a pair of stripper-absorber means to ensure that the coupled out light energy is derived only from the core-guided modes propagating in the direction of interest.

11 Claims, 5 Drawing Figures

DIRECTIONAL OPTICAL WAVEGUIDE COUPLERS

BACKGROUND OF THE INVENTION

The present invention relates to a directional optical waveguide coupler, and more particularly, to a directional optical waveguide coupler wherein at least a portion of the light energy propagating in a direction of interest in the core of a cladded optical waveguide is coupled into a selected region of the cladding, which region is isolated from spurious cladding modes, and then coupled out of the selected cladding region for subsequent conversion to a representative electrical signal.

In future optical fiber transmission systems, it is expected that arrangements will be required for extracting signal wave information from optical waveguides. To monitor and control the transmission through an optical waveguide link, for example, it may be required to sample the signal propagating through the individual optical waveguides periodically along the link. Optical data bus links will require that signals be extracted for utilization at numerous selected points along the link. In most instances, it would be desirable if a portion of the signal propagating through the fiber could be tapped therefrom without breaking or terminating the fiber. Fiber terminations can add unwanted optical losses to the system, and would unfavorably increase the need for highly precise splicing and interconnecting arrangements.

Arrangements for tapping signal power from an intermediate portion of an optical fiber waveguide without requiring that the fiber be terminated or broken are known. For example, in patent application Ser. No. 522,518 of W. M. Muska, now U.S. Pat. No. 3,936,631, there is disclosed an arrangement wherein power is coupled out of the fiber waveguide by a dielectric body disposed in a coupling relationship with an intermediate length of the fiber, and is converted to a representative electrical signal suitable for utilization by a photodetector disposed adjacent to the dielectric body. To tap cladded fiber waveguides, all or most of the outer cladding is removed from the fiber in the vicinity of the fiber tap so that the dielectric body of the tap can extract power directly from the inner core. The dielectric body of the tap is disposed at least within about three optical wavelengths of the inner core to achieve the desired coupling relationship. Alternatively, the fiber is bent in the vicinity of the fiber tap to cause a portion of the optical power to radiate out of the inner core into the outer cladding from which it can be extracted by the dielectric body. In either case, some fraction of the power is tapped from the fiber, provided the index of refraction of the dielectric body is approximately equal to, or greater than, the index of refraction of the outer cladding of the fiber.

In patent application Ser. No. 522,519 of S. E. Miller, now U.S. Pat. No. 3,931,518, the above-cited Muska arrangement is improved to avoid removing most or all of the cladding by combining therewith means for coupling optical power propagating in the core of an optical waveguide into cladding modes. The mode coupling means illustratively takes the form of one or more corrugated plates which are pressed against the fiber to periodically deform a region of the fiber just preceding the fiber tap. Provided the spatial periodicity of the corrugations in the plates is properly selected, and the pressure exerted on the plates is sufficiently large, the periodic deformation of the fiber causes the desired higher order mode coupling, and assures that there is sufficient power distributed in the higher order modes of the fiber for the dielectric coupling body of the fiber to couple out. By adjusting the pressure that the plates exert against the fiber, it is possible to adjust the degreee of higher order mode coupling that takes place in the fiber. The above-mentioned Miller arrangement, however, does not prevent spurious cladding modes from reaching the energy tap, and therefore, cannot be considered a directional energy tap.

Prior art directional energy taps have generally included two separate optical waveguides positioned within an intermediate medium and arranged relatively close and substantially parallel to each other. Light propagating in a first direction in one optical waveguide is partially or fully transferred to the other optical waveguide by either the existence of a weak coupling between the two waveguides through the intermediate medium, or the application of electric or magnetic fields to change the coupling between the guides in the region of the intermediate medium. In this regard, see, for instance, U.S. Pat. Nos. 3,408,131, issued on Oct. 29, 1968 to N. S. Kapany; 3,558,213 and 3,589,794, issued on Jan. 26, 1971 and June 29, 1971, respectively, to E. A. J. Marcatili; and 3,859,503, issued on Nov. 26, 1974 to L. A. Riseberg et al.

SUMMARY OF THE INVENTION

The present invention relates to a directional optical waveguide coupler and, more particularly, to a directional optical waveguide coupler wherein a portion of the energy propagating in a direction of interest in the core of a cladded waveguide is coupled into a selected region of the cladding which has been isolated from spurious cladding modes and then coupled out of the selected cladding region for subsequent conversion to a representative electrical signal.

The present invention further relates to a directional optical waveguide coupler arrangement which can be used with either optical fiber waveguides or planar-form optical waveguides formed on a substrate. The optical waveguides can be single mode or multimode waveguides.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
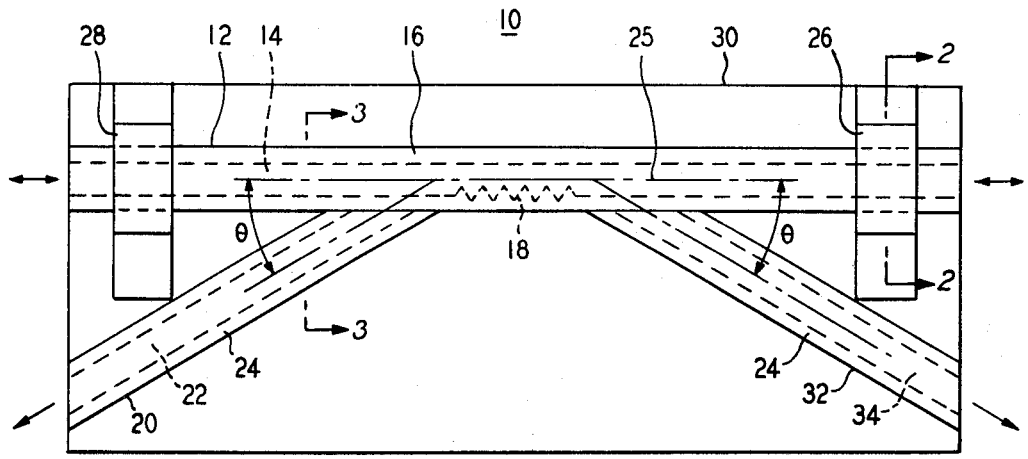
FIG. 1 is a top view of an illustrative embodiment of the present invention combining mode stripper-absorber means and mode coupling means with a main and branching planar-form optical waveguides.
Figure 2:
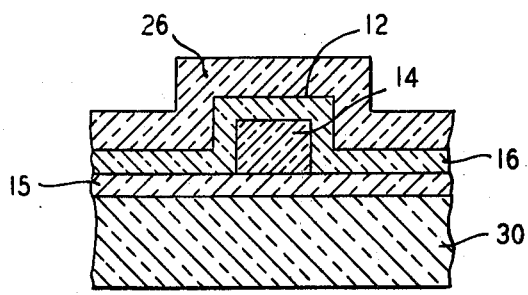
FIG. 2 is a cross-sectional view of a typical arrangement for the stripper-absorber means of FIG. 1.
Figure 3:
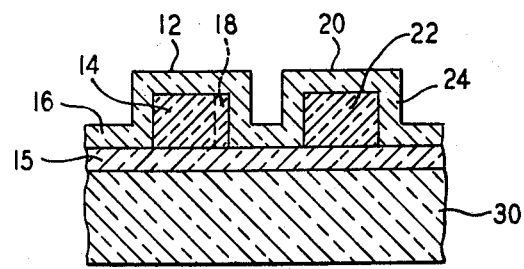
FIG. 3 is a cross-sectional view of the main and branching optical waveguide of FIG. 1 near the area of convergence therebetween.

FIG. 1 is a top view of a directional optical waveguide coupler 10 in accordance with the present invention for use with an intermediate length of, for example, a planar-form multimode optical waveguide 12. A multimode optical waveguide is one that is capable of guiding a plurality of modes of propagation of different orders. As shown in FIGS. 1 to 3, directional optical waveguide coupler 10 comprises the main optical waveguide 12 having a core 14 surrounded by cladding material 15 and 16 having an index of refraction which is approximately equal to or less than the index of refraction of the material of core 14; a mode coupling means 18 formed on the periphery of core 14 of waveguide 12; a first and a second branching planar-form multimode optical waveguide 20 and 32, respectively, which converge with waveguide 12 on opposite sides of mode coupling means 18 and have a core 22 and 34, respectively, surrounded by cladding material 15 and 24; and two stripper-absorber means 26 and 28 each formed over main optical waveguide 12 on a separate side of the mode coupling means 18-branching waveguide 20, 34 combination.

Mode coupling means 18 can comprise any arrangement which will cause at least a portion of the core-guided modes in core 14 of waveguide 12 to be transferred into cladding modes. As shown in FIG. 1, mode coupling means 18 can comprise periodic core width variations to accomplish the transfer of core-guided modes into cladding modes.

As will become clear from the following description, first branching waveguide 20 functions to couple out from waveguide 12 the cladding modes transferred out by mode coupling means 18 and propagating from right-to-left, while second branching waveguide 32 functions to couple out from waveguide 12 the cladding modes transferred out by mode coupling means 18 and propagating from left-to-right. Where it is desired to only tap light transmissions propagating in a first direction in waveguide 12, it is to be understood that directional coupler 10 need only include that branching waveguide 20 or 32 located downstream of mode coupling means 18 in the first direction. For purposes of discussion hereinafter, it will be assumed that the desired core-guided modes to be coupled out of waveguide 12 are propagating from right-to-left in core 14 of waveguide 12. It is to be understood that the description is similarly applicable to second branching waveguide 32 for core-guided modes propagating from left-to-right in waveguide 12. When reaching mode coupling means 18, a portion of the core-guided modes will be transferred into cladding modes. These cladding modes will continue to propagate from right-to-left in cladding 15 and 16 surrounding core 14 until they reach branching waveguide 20.

The core 22 of branching optical waveguide 20 is advantageously formed from optical material having an index of refraction which is greater than the index of refraction of either one of cladding material 15, 16 of waveguide 12 or cladding material 15, 25 of branching waveguide 20. As shown in FIG. 1, branching waveguide 20 branches away from main waveguide 12 at an acute angle to the selected downstream direction, with one end of core 22 in contact with cladding 15 and 16 of waveguide 12. With this arrangement, when the coupled out cladding modes reach the area where core 22 of branching waveguide 20 contacts cladding 15, 16 of waveguide 12, the cladding modes will be transferred into core 22 to continue as core-guided modes therein.

Using Snell's law, which relates the angle of reflection to the angle of refraction, it is possible to determine the preferred angle, $\Theta$, at which a branching waveguide 20 or 32 should converge with transmission waveguide 12 for maximum transfer of light energy. Mathematically expressed, Snell's law is:

$$\eta_1 \sin \Theta_i = \eta_2 \sin \Theta_r \qquad (1)$$

where $\eta_1$ is the refractive index of the cladding material 16 of transmission waveguide 12; $\eta_2$ is the refractive index of core material 22 or 34 of branching waveguide 20 or 32, respectively; $\Theta_i$ is the angle of reflection for light propagating in cladding 16 of transmission waveguide 12 relative to a reference plane normal to the longitudinal axis 25 of transmission waveguide 12 at the intersection with the core 22 or 34 of branching waveguide 20 or 32, respectively; and $\Theta_r$ is the angle of refraction for the light propagating in cladding 16 into core 22 or 34 of branching waveguide 20 or 32, respectively relative to the reference plane. In FIG. 1, $\Theta_i$ is equal to 90°, and $\Theta_r$ is equal to (90−$\Theta$)°. Substituting these values into Equation (1) results in the equation $$\eta_1/\eta_2 = \sin(90-\Theta) = \cos \Theta. \qquad (2)$$

If it is assumed that $$\eta_2 = \eta_1(1 + \delta), \qquad (3) \text{ and}$$

$$\cos \Theta = 1 - \tfrac{1}{2}\Theta^2, \qquad (4)$$

where $\delta$ is the differential by which refractive index $\Theta_1$ is greater than refractive index $\Theta_3$, then Equation (2) reduces to $$\delta = \tfrac{1}{2}\Theta^2. \qquad (5)$$

From Equation (5), it becomes clear that the preferred angle, $\Theta$, at which branching waveguide 20 or 32 should converge with transmission waveguide 12 is equal to $\sqrt{2\delta}$.

Stripper-absorber means 26 and 28 are each formed over cladding layer 16 to primarily couple out and absorb any spurious cladding modes introduced into the cladding 15, 16 from sources other than mode coupling means 18. Stripper-absorber means 26 and 28 are each formed from optical material having an index or refraction which is equal to or greater than the index of refraction of the material of cladding layer 16 to primarily couple out spurious cladding modes propagating in waveguide 12 towards branching waveguide 20 or 32. To absorb the coupled out spurious cladding modes, stripper-absorber means 26 and 28 preferably have ions of any well known light absorbing material embedded in the optical material thereof. This light absorbing material can comprise, for example, ions of iron, copper or cobalt. Alternatively, a layer or light absorbing material (not shown), such as, for example, carbon black, can be deposited over the optical material of stripper-absorber means 26 and 28 to absorb the coupled out spurious cladding modes. Stripper-absorber means 26 and 28, of course also remove the coupled out cladding modes from mode coupling means 18 which may not have been transferred to core 22 of branching waveguide 20.

As shown in FIGS. 1–3, directional optical waveguide coupler 10 is typically formed by depositing a first layer of cladding material 15 on the surface of a substrate 30. The core material 14 of main optical waveguide 12 is then deposited on cladding layer 15 and the mode-coupling means 18 formed on the exposed core 14. After shielding cladding layer 15 in the area where branching waveguide 20 and/or 32 is to be situated, cladding layer 16 is deposited over both core 14 and cladding layer 15. The core 22 and/or 34 of branching waveguide 20 and/or 32, respectively, is next formed on cladding layer 15 after which the cladding layer 24 is deposited on both core 22 and/or 34 and cladding layer 15. Finally, the material forming stripper-absorber means 26 and 28 is deposited over cladding layer 16. Stripper-absorber means 26 is shown as extending from the upper edge of substrate 30, over waveguide 12 and adjacent to branching waveguide 32 to absorb spurious cladding modes propagating in transmission waveguide 12 from right-to-left in FIG. 1 and thereby prevent these cladding modes from reaching branching fiber 20 and/or 32. Stripper-absorber means 28 is shown in FIG. 1 as extending from the upper edge of substrate 30, over waveguide 12 and adjacent to branching waveguide 20 to absorb spurious cladding modes propagating in transmission waveguide 12 from left-to-right in FIG. 1 and thereby prevent these cladding modes from reaching branching waveguide 20 and/or 32. Stripper-absorber means 26 and 28 could of course, extend completely across substrate 30 to also cover branching waveguide 32 and 20, respectively, and thereby also strip spurious cladding modes propagating in either direction in waveguide 20 and/or 32.

Figure 4:
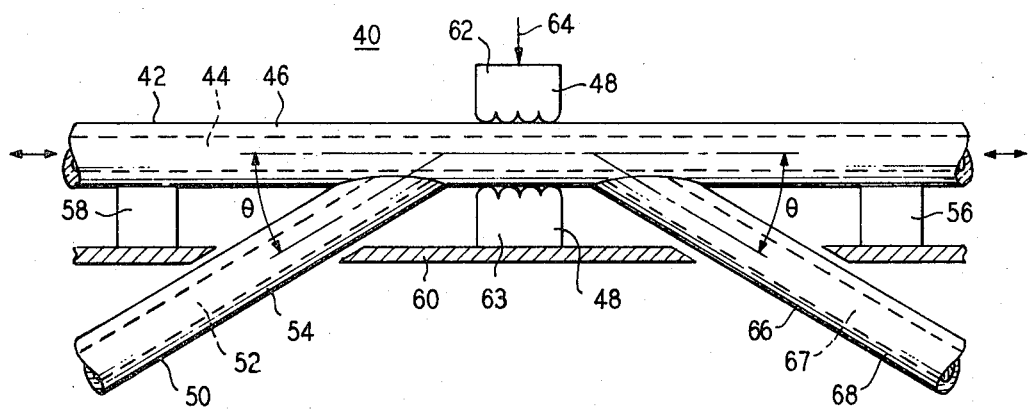
FIG. 4 is a side view of an arrangement equivalent to FIG. 1 for use with optical fiber waveguides.

FIG. 4 shows a side view of a directional optical waveguide coupler in accordance with the present invention which is similar to coupler 10 of FIG. 1 but is designed for use with a main multimode optical fiber waveguide 42. As shown in FIG. 4, coupler 40 comprises a main fiber waveguide 42 including a core 44 surrounded by a layer of cladding material 46 having an index of refraction which is less than the index of refraction of the material of core 44; a mode coupling means 48; a first and a second branching multimode optical fiber waveguide 50 and 66, respectively, including a core 52 and 67, respectively, surrounded by a layer of cladding material 54 and 68, respectively, having an index of refraction which is less than the index of refraction of the material of core 52 and 67, respectively; and two stripper-absorber means 56 and 58. The mode-coupling means 48 and the two stripper-absorber means 56 and 58 are each positioned in contact with cladding 46 of fiber waveguide 42 and are preferably mounted on a support 60 to substantially avoid the formation of stresses within fiber waveguide 42.

Mode-coupling means 48 corresponds to the mode-coupling means disclosed in the hereinbefore-cited S. E. Miller application. As discussed in that application, mode-coupling means 48 comprises a pair of corrugated plates 62 and 63 which are pressed against fiber 42 to periodically deform a region of fiber 42 upstream of where, for instance, branching fiber 50 contacts fiber 42. Plates 62 and 63 can be pressed against a region of fiber 42 which includes its outer cladding 46. The spatial periodicity of the corrugations in plates 62 and 63, and the pressure that the plates exert on fiber 42 (e.g., pressure is illustratively applied to plate 62 in the direction of arrow 64 in FIG. 4), are selected so that a periodic deformation results in the cross-sectional dimensions of the inner core 44 of fiber 42, or in the direction of the axis of the inner core of fiber 42, or both. The desired mode coupling occurs in fiber 42 provided the spatial periodicity of the corrugations in plates 62 and 63, and thus of the deformation in fiber 42, is properly selected.

The selection of the appropriate spatial periodicity for the mode coupling means is made in accordance with the theory set forth in the articles by D. Marcuse and by D. Marcuse and R. M. Derosier, respectively, published in Volume 48 of the *Bell System Technical Journal*, pages 3187–3232 (December 1969). It is to be understood, however, that the above description of mode-coupling means 48 is for purposes of exposition and not for purposes of limitation, and that mode-coupling means 48 can comprise any arrangement which will provide the desired mode coupling.

Stripper-absorber means 56 and 58 are each disposed on an opposite side of the mode coupling means 48-branching fiber 50, 66 combination and in contact with the cladding 46 of fiber 42. Stripper-absorber means 56 and 58 function to absorb cladding modes propagating therebeneath and are shown as comprising a block of dielectric material which is preferably relatively compliant such as soft plastic to permit a reasonably large area of contact with cladding 46. To couple out the cladding modes, the block of dielectric material of stripper-absorber means 56 and 58 has an index of refraction which is equal to or greater than the index of refraction of the material of cladding 46. To absorb the coupled out cladding modes, stripper-absorber means 56 and 58 can have either ions of a light absorbing material, such as, for example, iron, copper or cobalt embedded in the block of dielectric material, or a layer of light absorbing material, such as, for example, carbon black, deposited on the surface of the block of dielectric material opposite the surface in contact with cladding layer 46.

The operation of the coupler 40 of FIG. 4 corresponds to that described hereinbefore for coupler 10 of FIG. 1. If it is assumed that light is propagating from right-to-left in core 44 of fiber 42, the core-guided modes will pass beneath stripper-absorber 56 without effect and a portion thereof will be transferred to cladding modes by mode-coupling means 48. The nontransferred core-guided modes will continue to propagate in core 44 beneath stripper-absorber means 58 without effect. The transferred cladding modes will pass adjacent core 52 of branching fiber 50 where the cladding modes will be removed to propagate further as core-guided modes in core 52. The end of branching fiber 50 engaging cladding 46 of fiber 42 is preferably contoured to correspond to the outer periphery of fiber 42 to ensure a maximum area of contact between core 52 and cladding 46. Stripper-absorber means 56 and 58 function to remove spurious cladding modes propagating toward the mode coupling means 48-branching fiber 50 combination to ensure that only transferred out cladding modes from mode-coupling means 48 propagating from right-to-left are present in branching fiber 50. It is to be understood that the hereinbefore description for first branching fiber 50 is similarly applicable to second branching fiber 66 for core-guided modes propagating from left-to-right in fiber 42.

Figure 5:
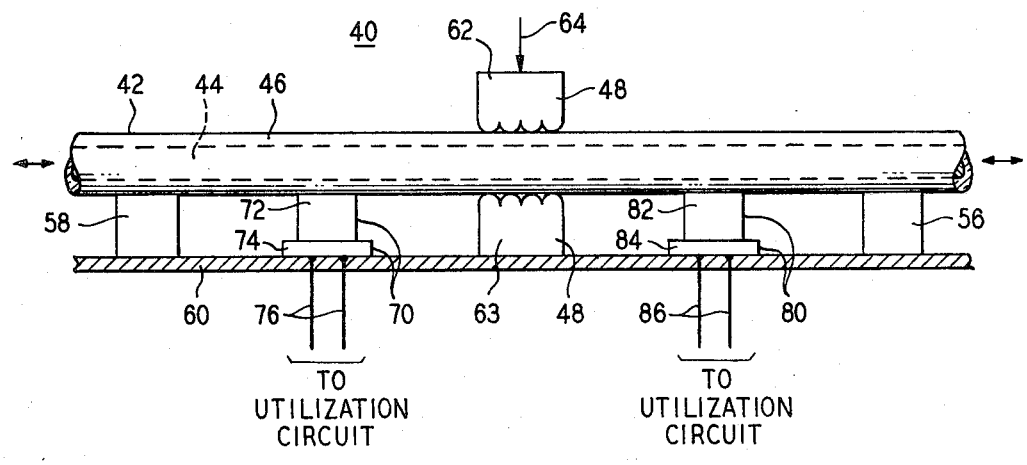
FIG. 5 is a side view of another illustrative embodiment of the present invention similar to FIG. 4 but where energy taps are substituted for the branching optical waveguides.

FIG. 5 shows a modified form of the coupler 40 of FIG. 4 where branching fiber 50 and 66 have been replaced by a fiber tap 70 and 80, respectively, which convert the intercepted cladding modes transferred out by mode-coupling means 48 into a representative electrical signal. Fiber tap 70 or 80 can comprise any well-known device which is capable of converting light energy propagating in an adjacent material into a representative electrical signal. One such arrangement was disclosed in the hereinbefore-cited W. M. Muska and S. E. Miller applications and is shown in FIG. 5. Typically, such device comprises a disk 72 or 82 formed of a relatively compliant dielectric material, such as a soft plastic, having an index of refraction equal to or greater than the index of refraction of cladding 46 of fiber 42. Disk 72 or 82 serves to couple optical power out of cladding 46 of fiber 42, and, as noted in the hereinbefore-cited Muska and Miller applications, preferably has an index of refraction which is in the range of about 0.8 times the index of refraction of the fiber cladding material and greater. When disk 72 or 82 is forced against cladding 46, the fiber deforms the upper surface of disk 72 or 82 to provide a relatively large area of contact therewith. To convert the coupled out optical power into a representative electrical signal, a photodetector 74 or 84 is positioned adjacent the surface of disk 72 or 82, respectively, opposite that surface which is in contact with cladding layer 46.

Photodetector 74 or 84 is illustratively a solid state photodiode of the p-i-n form, such as the SGD 100A, 100 mil, silicon p-i-n photodiode manufactured and offered commercially by E. G. & G., Inc. It is designed to respond to the wavelength of the optical signal propagating through fiber 42 which is illustratively about 1 micrometer ($\mu$m). The resulting electrical signal is transmitted over leads 76 or 86 from photodetector 74 or 84, respectively, to an external utilization circuit (not shown).

It is to be understood that the above-described embodiments are simply illustrative of the principles of the invention. Various other modifications and changes may be made by those skilled in the art which will embody the principles of the invention and fall within the spirit and scope thereof. For example, the present invention, as described hereinbefore, could be adapted for use with single-mode transmissions, and is especially useful for tapping light energy traveling in a selected direction when bidirectional transmissions may be used in an optical waveguide.

What is claimed is:

1. A directional optical waveguide coupler comprising:
    a main optical waveguide comprising a core capable of transmitting light energy in at least a first direction surrounded by a layer of cladding material having an index of refraction which is less than the index of refraction of said core material;
    mode coupling means disposed at a first intermediate longitudinal position along said main optical waveguide capable of enhancing mode coupling from core-guided modes to cladding modes in said main optical waveguide;
    means for transferring out of said cladding layer the cladding modes generated by said mode coupling means and propagating in said first direction for subsequent conversion to a representative electrical signal, said transferring means being disposed at a second intermediate longitudinal position along said main optical waveguide downstream of said first intermediate longitudinal position in said first direction and having an index of refraction which is equal to or greater than the index of refraction of said cladding material of said main optical waveguide;
    a first stripper-absorber means comprising both a body of dielectric material disposed in coupling relationship with the cladding of said main optical waveguide and a light absorbing means and disposed along said main optical waveguide at a third intermediate longitudinal position upstream of said first intermediate position in said first direction for removing and absorbing cladding modes propagating therebeneath in said main optical waveguide; and
    a second stripper-absorber means comprising both a body of dielectric material disposed in coupling relationship with the cladding of said main optical waveguide and a light absorbing means and disposed along said main optical waveguide at a fourth intermediate longitudinal position downstream of said second intermediate position in said first direction for removing and absorbing cladding modes propagating therebeneath in said main optical waveguide.

2. A directional optical waveguide coupler according to claim 1, wherein
    said transferring out means comprises a branching optical waveguide which diverges from said main optical waveguide at an acute angle in said first direction, said branching optical waveguide comprising a core surrounded by cladding material, the core of said branching waveguide having one end thereof engaging the cladding of said main optical waveguide and having an index of refraction which is equal to or greater than the index of refraction of the cladding material of said main waveguide.

3. A directional optical waveguide coupler according to claim 2 wherein said main optical waveguide and transferring out means comprise planar-form optical waveguides fabricated on a substrate.

4. A directional optical waveguide coupler according to claim 2 wherein said main optical waveguide and transferring out means comprise optical fiber waveguides.

5. A directional optical waveguide coupler according to claim 1 wherein said transferring out means comprises:
    a body of dielectric material disposed in coupling relationship with the cladding of said main optical waveguide, said body having an index of refraction which is equal to or greater than the index of refraction of the cladding material of said main waveguide, and
    a photodetector responsive to the wavelength of the optical signal to be propagated through said main optical waveguide, said photodetector being disposed adjacent said dielectric body and oriented to intercept the optical power coupled out of the cladding of the main optical waveguide by said dielectric body.

6. A directional optical coupler according to claim 1 wherein said light absorbing means comprises either one of a layer of light absorbing material formed on said body of dielectric material and a plurality of light absorbing particles embedded in said body of dielectric material, said light absorbing means being oriented to absorb the optical power coupled out of the cladding of said main optical waveguide by said dielectric body.

7. A directional optical coupler according to claim 1 wherein said main optical waveguide is further capable of transmitting light energy in a second direction and the directional coupler further comprises second means for transferring out of said cladding layer the cladding modes generated by said mode coupling means and propagating in said second direction for subsequent conversion to a representative electrical signal, said second transferring means being disposed at a fifth intermediate position along said main optical waveguide between said first and third intermediate positions and having an index of refraction which is equal to or greater than the index of refraction of the cladding material of said main optical waveguide.

8. A directional optical waveguide coupler according to claim 7, wherein said second transferring out means comprises a branching optical waveguide which diverges from said main optical waveguide at an acute angle with said second direction, said branching optical waveguide comprising a core surrounded by cladding material, the core of said branching waveguide having one end thereof engaging the cladding of said main optical waveguide and having an index of refraction which is equal to or greater than the index of refraction of the cladding material of said main waveguide.

9. A directional optical waveguide coupler according to claim 8 wherein said main optical waveguide and said first and second transferring out means comprise planar-form optical waveguides fabricated on a substrate.

10. A directional optical waveguide coupler according to claim 8 wherein said main optical waveguide and said first and second transferring out means comprise optical fiber waveguides.

11. A directional optical waveguide coupler according to claim 7 wherein said second transferring out means comprises a body of dielectric material disposed in coupling relationship with the cladding layer of said main optical waveguide, said body having an index of refraction which is equal to or greater than the index of refraction of the cladding material of the main waveguide, and a photodetector responsive to the wavelength of the optical signal to be propagated through said main optical waveguide, said photodetector being disposed adjacent said dielectric body and oriented to intercept the optical power coupled out of the cladding layer of the main optical waveguide by said dielectric body.

* * * * *